L. GARRIGUS.
Lock Washer for Nuts.

No. 229,601.  Patented July 6, 1880.

Witnesses.
J. Edwards.
Richard J. Thompson.

Inventor.
Lewis Garrigus.
By James Shepard, Atty.

UNITED STATES PATENT OFFICE.

LEWIS GARRIGUS, OF WATERVILLE, CONNECTICUT, ASSIGNOR OF ONE-HALF OF HIS RIGHT TO RODOLPH BERRY, OF SAME PLACE.

LOCK-WASHER FOR NUTS.

SPECIFICATION forming part of Letters Patent No. 229,601, dated July 6, 1880.

Application filed October 6, 1879.

*To all whom it may concern:*

Be it known that I, LEWIS GARRIGUS, of Waterville, in the county of New Haven and State of Connecticut, have invented certain new and useful Improvements in Lock-Washers for Nuts, of which the following is a specification.

My invention consists of a washer having a nut-receiving socket upon one side, and upon the opposite side spring-dogs placed in recesses which expose the edge of the dogs, all as hereinafter more fully described.

Figure 1:
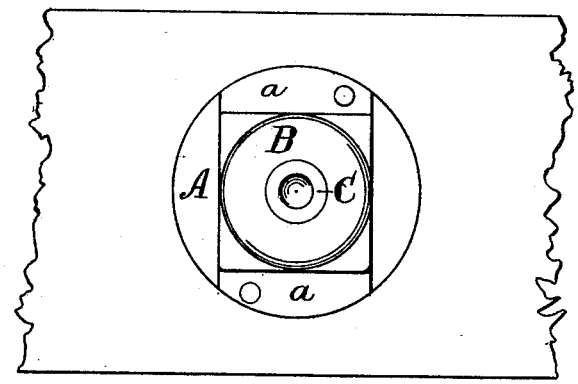
Figure 2:
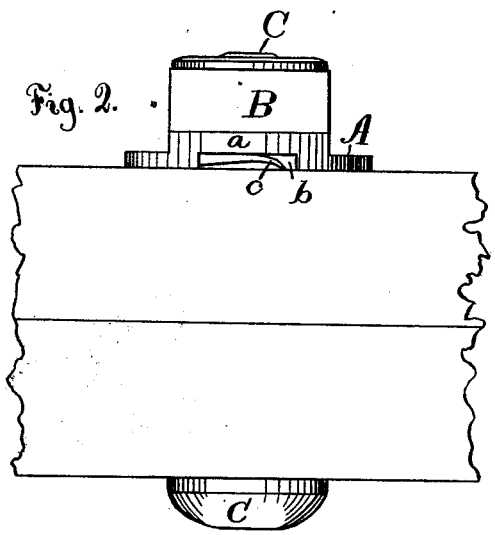

In the accompanying drawings, Figure 1 is a plan view of a washer which embodies my invention, the same being represented in connection with a bolt, nut, and blocks. Fig. 2 is a side elevation of the same, and Fig. 3 is a view of the under or face side of said washer.

A designates the washer, B the nut, and C the bolt. This washer is designed for general use in connection with nuts and bolts of ordinary construction, either old or new, and without making any change in said nuts or bolts or the machine or object in which they are used.

Figure 3:
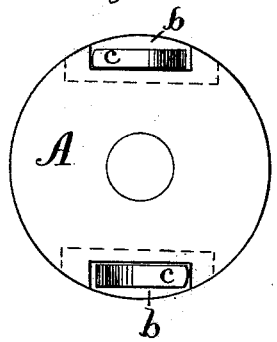

Upon one side of the washer A, I form two elevations, $a\ a$, the confronting sides of which are parallel, thereby forming a nut-receiving socket between them, with walls on two opposite sides, adapted to receive a square nut, as shown in Figs. 1 and 2, and also indicated by broken lines in Fig. 3, by which figures it will be seen that the nut when in the socket cannot be turned independent of the washer. Of course the elevations $a\ a$ might be made on four sides instead of only two, if desired; but two are all that is necessary.

Upon the opposite side of the washer A, and directly opposite the elevations $a\ a$, I form depressions $b\ b$, which are open not only on the face of the washer, but also on the edge. In these depressions I secure stout spring-dogs $c\ c$, which, when the washer is not in use, have one end projecting slightly from the face of the washer.

The dogs shown in the drawings are designed for use upon bolts having a right-hand thread, and they will be faced in the opposite direction when designed for use upon left-handed bolts.

In use the washer is slipped over the end of the bolt, and the nut screwed down until it reaches and is received by the socket, after which the nut and washer will turn together in screwing the nut farther down into place. The ends of the dogs $c\ c$ will merely wipe the object against which the washer is placed when the nut is screwed down; but in any attempt to unscrew the nut the ends of the dogs will impinge against the metal or base upon which the washer rests, and prevent said washer, and consequently the nut also, from moving in the return direction.

If desired, small indentations may be made in the metal against which the washer is used at points opposite the concentric path described by the dogs; but such indentations are believed to be unnecessary.

This washer is also equally applicable for use upon a wooden base, and if designed solely for use upon wood it might be made with the dogs projecting somewhat farther from the face of the washer.

If desired, one feature of my invention may be embodied in spring-dogs placed in depressions in the face of the nut, said depressions being left open on the face and edge of the nut to expose the edge of the dogs, as shown, in the washer.

By making the depressions $b$ opposite the elevations $a$ and outside of the nut-receiving socket the washer may be made quite thin at the bottom of said socket, and thereby it is better adapted for use on bolts in existing machines.

By making the depressions open at the edge of the washer the outer edge of the dogs is exposed and accessible, so that a wedge may be readily inserted under the points of said dogs to release them for the purposes of turning the nut and washer backward. When used in positions where this cannot be done the elevations and dogs can be readily cut off with a chisel, leaving the bolt and nut in good order for subsequent use with a new washer, the expense of which is only trifling.

I claim as my invention—

1. The washer A, having nut-receiving socket upon one side and the depressions $b\ b$ upon the opposite side, said depressions being open both upon the flat side and the edge of said washer, in combination with the spring-dogs *c c*, located in said depressions, with their edge exposed when the washer is placed with the side having the depressions *b b* against a flat surface, substantially as described, and for the purpose specified.

2. A lock-washer for nuts having elevations *a a*, with nut-receiving socket between upon one side, and upon the opposite side, at a point directly under said elevations, depressions containing the spring-dogs *c c*, substantially as described, and for the purpose specified.

LEWIS GARRIGUS.

Witnesses:
CHAS. W. GILLETTE,
GEO. H. IVES.